(12) United States Patent
Peng

(10) Patent No.: US 6,674,800 B1
(45) Date of Patent: Jan. 6, 2004

(54) METHOD AND SYSTEM FOR UTILIZING A GLOBAL OPTIMAL APPROACH OF SCALABLE ALGORITHMS

(75) Inventor: Shaomin Peng, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 680 days.

(21) Appl. No.: 09/649,777

(22) Filed: Aug. 29, 2000

(51) Int. Cl.[7] .............................. H04N 7/12; H04N 7/50
(52) U.S. Cl. .............................. 375/240.25; 375/240.29
(58) Field of Search ........................ 375/240.25, 240.29, 375/240.02, 240.03, 240.2, 240.22, 240.23; 382/233, 239, 250, 251, 253; 348/403.1, 404.1; H04N 7/50, 7/12

(56) References Cited

U.S. PATENT DOCUMENTS

| | | | |
|---|---|---|---|
| 5,781,239 A | | 7/1998 | Mattela et al. |
| 5,875,003 A | * | 2/1999 | Kato et al. .................. 348/699 |
| 6,043,844 A | * | 3/2000 | Bist et al. .............. 375/240.24 |
| 6,067,118 A | * | 5/2000 | Chen et al. ............. 375/240.03 |
| 6,205,177 B1 | * | 3/2001 | Girod et al. ........... 375/240.14 |
| 6,266,817 B1 | * | 7/2001 | Chaddha ..................... 725/146 |
| 6,542,545 B1 | * | 4/2003 | Vetro et al. ............ 375/240.08 |
| 6,580,759 B1 | * | 6/2003 | Peng ....................... 375/240.25 |

FOREIGN PATENT DOCUMENTS

| | | | |
|---|---|---|---|
| EP | 0739139 A3 | 10/1996 | ............ H04N/7/26 |
| EP | 0739139 A2 | 10/1996 | ............ H04N/7/26 |
| EP | 0739140 A2 | 10/1996 | ............ H04N/7/26 |
| EP | 0739140 A3 | 10/1996 | ............ H04N/7/26 |
| EP | 0912063 A2 | * 4/1999 | ............ H04N/7/50 |
| WO | WO9408438 | 4/1994 | ............ H05B/37/03 |
| WO | WO9950828 | 10/1999 | ............ G10L/3/02 |

* cited by examiner

Primary Examiner—Nhon Diep

(57) ABSTRACT

A method and system for operating a programmable processing device to reduce distortion in an outputted signal. The method includes: providing data being indicative of a plurality of operational states, each of the states being with at least one of a plurality of operational modes of the device, a complexity of operations and a distortion level; selecting one of the states for each of the complexities using the data and based upon the distortion levels; determining an operating status of the device; and, selecting which of the operational modes to operate the device in for each of the complexities responsively to the determined (minimal distortion) status using the selected states. The system includes: at least one scalable application being operable in plurality of modes each having a different complexity of operations characteristic; a QOS resource manager for tracking how much computing resources are available for use by the at least one scalable application; a strategy manager for determining whether the available resources are suitable for operation of the scalable application in a given one of the modes; and, a local resource control responsive to the strategy manager and for selecting, in response to a determination by the strategy manager that the available resources are not suitable for operation of the at least one application in the given mode to select another of the modes for the at least one application. The QOS manager and strategy manager are mutually responsive to one another and the at least one scalable application is responsive to the local resource control.

16 Claims, 7 Drawing Sheets

METHOD AND SYSTEM FOR UTILIZING A GLOBAL OPTIMAL APPROACH OF SCALABLE ALGORITHMS

FIELD OF INVENTION

The present invention relates generally to scalable systems and more particularly to scalable multimedia communications systems such as an ATSC compliant video decoder.

BACKGROUND OF THE INVENTION

The current approach for measuring complexity-distortion in a given system is to measure the operational curves for a particular data model (algorithm). Using a generic IDCT algorithm of an MPEG2 decoder as an example, the algorithm assumes that all the data inside each 8×8 block is in use. The total number of multipliers and adders is a fixed number. However, with one particular algorithm, if the data pattern changes, the number of computational steps can be changed, hence the complexity regarding the computation time of the algorithm is different. With the change of complexity levels, the output distortion is also different, i.e. different operational points 18 are utilized. The corresponding operational curve for this algorithm can be measured. If a different IDCT algorithm is adopted for the decoder, then a different operational curve can be drawn, e.g. curves 30, 40.

Rapid development in the multimedia processing industry has promoted programmable multimedia processing devices instead of traditional dedicated hardware solutions, e.g. Application Specific Integrated Circuits (ASICs). The programmable functionality of software-oriented devices has tremendously increased the flexibility of these types of multimedia and communication systems. Programmable devices are commonly used for adjusting or scaling functions complexity to certain levels according to available computational resources. This provides system scalability. However, when function complexity is scaled down, the performance of the system often degrades as compared to conventional dedicated hardware solutions. Therefore it is desirable to minimize performance degradation or distortion, at each function complexity level to maintain the overall performance of the system.

In theory, scalability deals with the tradeoff of function complexity and distortion via information rate and resource constraints. When computational resources decrease, the computing or processing power for performing the original amount of function complexity is decreased, thereby forcing the scalable algorithm to retreat to a lower level of function complexity One example of where a scalable design can be utilized is in a Digital Television (DTV) video decoder adapted to receive and decode information streams, e.g. television signals. The processing capability of the decoder is practically limited by the constraints of the decoder's processor, e.g. available computing resources. The decoder's processing capabilities may be limited to the point where it is insufficient for processing the received bitstream for displaying at an accepted quality standard. Hence, one way to enable the processor to decode the bitstream is to lower the quality of one of the functions. For example, the quality displayed in a Picture-In-Picture (PIP) window may be set lower (still acceptable) than the quality of the main channel being displayed by lowering the processing complexity of the windowed bitstream without altering the decoding quality of the main bitstream corresponding to the main channel. Accordingly, different processing complexities can be used for different bitstreams depending upon a respective modes of operations. This in turn permits the limited processing capabilities of the decoder to be better utilized to enable multiple bitstreams to be simultaneously processed.

Referring now to FIG. 1, the Information-Based Complexity theory (IBC) shows that there is a minimal Complexity-Distortion (C-D) bound 10 for each given system. FIG. 1 shows that the rate distortion bound 10 is a convex function. This curve 10 precisely defines the theoretical boundary between achievable function complexity-distortion (region 12) and non-achievable function-complexity distortion (region 14).

For purposes of background, C. E. Shannon published his work on Information Theory (IT) in 1948. As a branch of IT, Rate Distortion Theory (RDT) comes under the umbrella of source coding and compression, which is concerned with the tasks of maximally stripping redundancy from a source, subject to a quality criterion. In other words, RDT is concerned with representing a source with the fewest number of bits possible for a given reproduction quality. The tradeoff encountered in RDT is between information rate and output distortion. It should be recognized though that in RDT, there are typically no computational constraints on what the output decoding system can do.

To extend RDT to get complexity-distortion tradeoff and scalability issues investigated, the Information-Based-Complexity (IBC) theory was developed. IBC is a branch of computational complexity that studies problems for which the information is partial, contaminated, and priced. IBC claims that the computation of an algorithm could be scaled down by limiting the amount of input information to be processed. The complexity of an algorithm can be generalized to a function of the amount of information processed to generate an output sequence.

As indicated, the region 12 above the curve 10 is theoretically algorithm achievable, while the region 14 underneath is non-achievable. For a particular system, the complexity is limited. In other words, the complexity of the system has a boundary in order to let the system perform normally. The boundary of the complexity is described as $[C_{min}, C_{max}]$. Furthermore, the output quality also has limitations, i.e. the distortion range $[D_{min}, D_{max}]$. $D_{min}$ means the best result the system can provide, while $D_{max}$ means the worst result that the user could tolerate. Hence, the workable region of a realistic system is the region 16.

Theoretically, an optimal design is achieved if the performance curve of a designed system achieves the lowest C-D bound 10. However, it is not realistic to achieve the theoretical bound 10 perfectly with a practical system. For a given system and a given data model (algorithm), each set of test data will give a quality distortion rate. Referring also to FIG. 2, for such a system model, each point of complexity and distortion pair derived from a practical system is called an operational point 18. A group of operational points 18 compose an operational curve, e.g. 30 or 40. For different data models, e.g. algorithms, there will be different operational curves. Each operational point 18 on the operational curve, e.g. 30 or 40, is achievable by the system with a chosen implementation and given test data. Scalability can be defined as a transition between two operating points 18 with different complexity coordinates in the achievable region 16. The best scalable algorithm has an operational curve which closely approximates the lowest C-D bound 10. In FIG. 2, a first given system and data model, i.e. algorithm, gives a first complexity-distortion curve 30, while a second provides curve 40. Theoretically, the distance of operational curves 30, 40 from theoretical lowest complexity-distortion bound 10 illustrates how good each system design is. Often in a real design situation, the lowest bound 10 is not available and the operational curves 30, 40 are not parallel.

The MPEG2 video decoder used in the above example is commonly employed in Advanced Television Systems Committee (ATSC) compliant Digital Television (DTV) systems. In particular FIG. 3 illustrates a conventional video decoder 100 block diagram suitable for use in an ATSC DTV compliant system as taught by GUIDE TO THE USE OF THE ATSC DIGITAL TELEVISION STANDARD, ATSC Doc. A/54, Oct. 4, 1995.

Briefly, the decoder 100 includes a channel buffer 200 which receives a coded video bitstream signal A and outputs a signal B . A Variable Length Decoder (VLD) 300 receives signal B and reconstructs 8×8 arrays of quantized Discrete Cosine Transform (DCT) coefficients to provide DCT coefficients in quantized form as signal C and motion vectors as signal H. Motion Compensator 700 receives signals H and I, which includes data for anchor frames stored in memory 800 and provides motion compensated predicted pixel values as signal G. Inverse quantizer 400 receives signal C and dequantizes it to provide signal D which includes quantized prediction error DCT coefficients in standard form. Inverse Discrete Cosine Transform (IDCT) 500 receives signal D and transforms it to obtain pixel values or prediction errors as signal E. Adder 600 receives signals E and G and sums them to provide reconstructed pixel values which are degraded by quantization as signal F which is provided as decoded video data and also to memory 800.

SUMMARY OF THE INVENTION

A method and system for operating a programmable processing device to reduce distortion in an outputted signal, the method including: providing data being indicative of a plurality of operational states, each of the states being associated with at least one of a plurality of operational modes of the device, a complexity of operations and a distortion level; selecting one of the states for each of the complexities using the data and based upon the distortion levels; determining an operating status of the device; and, selecting which of the operational modes to operate the device in for each of the complexities responsively to the determined status using the selected states.

The system including: at least one scalable application being operable in plurality of modes each having a different complexity of operations characteristic; a QOS resource manager for tracking how much computing resources are available for use by the at least one scalable application; a strategy manager for determining whether the available resources are suitable for operation of the scalable application in a given one of the modes; and, a local resource control responsive to the strategy manager and for selecting, in response to a determination by the strategy manager that the available resources are not suitable for operation of the at least one application in the given mode to select another of the modes for the at least one application; wherein, the QOS manager and strategy manager are mutually responsive to one another and the at least one scalable application is responsive to the local resource control.

BRIEF DESCRIPTION OF THE FIGURES

Various objects, features and advantages of the invention will become more apparent by reading the following detailed description in conjunction with the drawings, which are shown by way of example only, wherein.

DETAILED DESCRIPTION OF THE INVENTION

The present invention generally involves comparing different C-D curves that achieve the same task, so that an algorithm which is more efficient regarding the trade-off of the complexity and the quality distortion at certain complexity levels than available alternatives can be identified. Therefore the best algorithm which gives the minimal quality distortion at certain complexity can be selected, and the global optimal approach can be achieved for the given set of algorithms under assumed complexity and distortion ranges.

Figure 4:
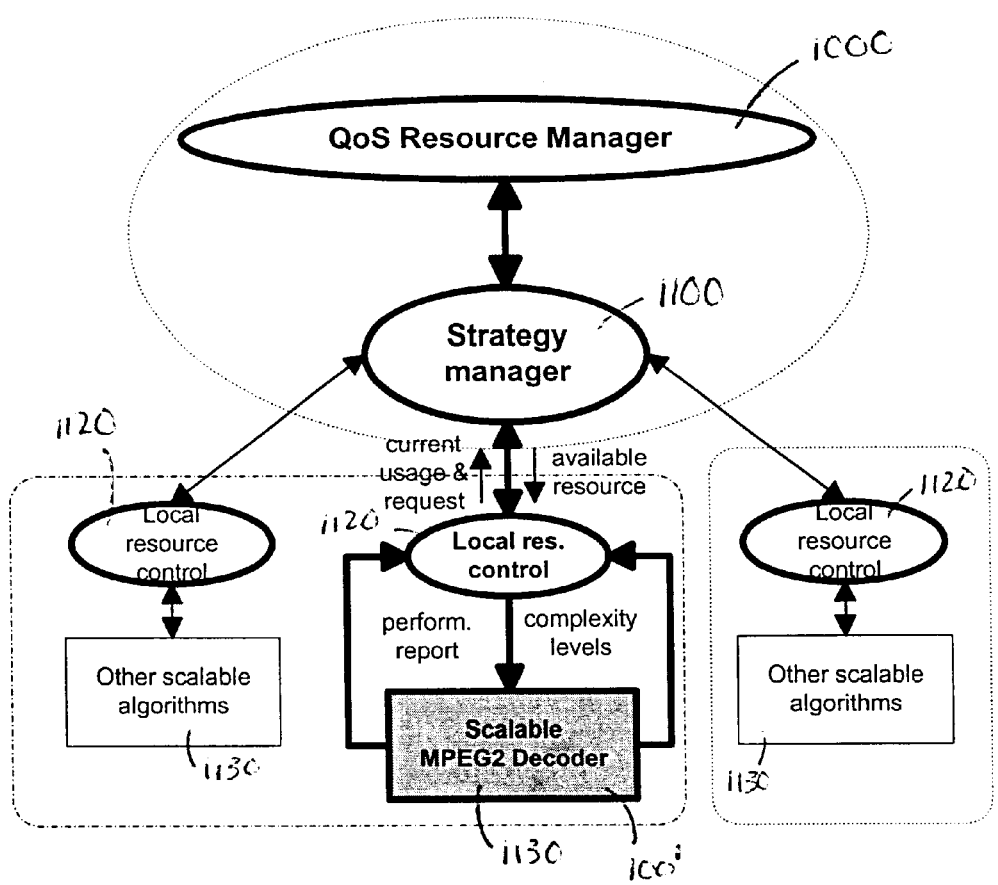
FIG. 4 illustrates a block diagram of a control system used according an embodiment of the present invention.

Referring now to FIG. 4, the scalable video algorithm design control system made according to the concepts of the present invention preferably includes four elements: a Quality Of Service (QOS) resource manager 1000; a strategy manager 1100; a local resource control 1120; and scalable algorithms 1130. The QOS resource manager 1000 oversees resource usage within an entire system, or grouped subsystems. It sends out control commands to the strategy manager 1100 when system resources vary, and receives feedback from the strategy manager 1100 when subsystems are scaled. The strategy manager 1100 serves as an envoy for the QOS manager 1000 which has the power to command different scalable algorithms' 1130 via local controller 1120 to scale up or down in order to adapt to the resource level change. Although the strategy manager 1100 controls the overall scaling of levels of different applications, it does not control the detail of the scalability of a specific algorithm 1130. For example, it controls the total complexity level of the MPEG2 decoder, but it does not have the control about which algorithm of the MPEG2 decoder should be scaled down to what level. This is the work of the local resource control 1120. The local resource control 1120 (also known as decoding resource control or complexity switching control) knows exactly how each functional block inside of the MPEG2 decoder is scaled and to what level. Ultimately, the scalable algorithms 1130 are the keys that fulfill the scalability job.

In other words, it should be understood that in general QOS is well understood by those possessing an ordinary skill in computer quality control/information management. The QOS manager 1000 basically manages the use of computing resources, e.g. in use, not in use, monitors information flow, and responds to requests from applications that demand or are using resources. The strategy manager 1100 satisfies a need for communication between the QOS manager 1000 and scalable applications which use the scalable algorithms 1130, such as the scalable MPEG2 decoder of FIGS. 5 or 7. The strategy manager 1100 handles and controls the resource uses of each individual scalable application and coordinates these applications.

Figure 5:
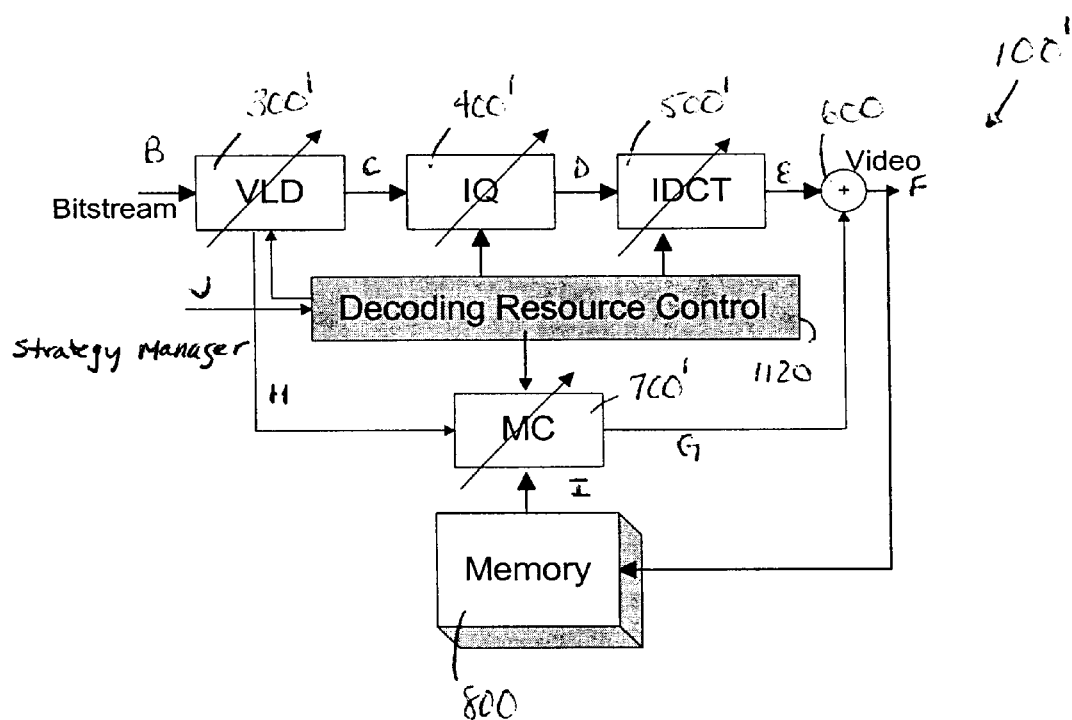
FIG. 5 illustrates a scalable video decoder block diagram for an ATSC compliant DTV system according to an embodiment of the present invention.

The local resource control 1120 serves as a local office manager for a particular scalable application. For example, and referring now to FIG. 5, therein is illustrated a scalable ATSC compliant DTV video decoder according to the present invention. Therein, the elements designated with a ' designate like elements to those of FIG. 3, except that they are scalable in accordance with the present invention. Hence, more than one functional block within the decoder 100' of FIG. 5 is scalable. In the MPEG2 decoder 100' the IDCT is one functional block for example. The local resource manager 1120 (also referred to as Decoding Resource Control) coordinates the activities and scalable levels of these blocks, e.g. how much each individual functional block should be scaled. If multiple scalable algorithms 1130 are available for a particular functional block, e.g. an IDCT, in order to achieve minimal distortion, when and where the switching of multiple algorithms, e.g. 30, 40, should apply, these control tasks are performed by the local resource manager 1120.

Figure 2:
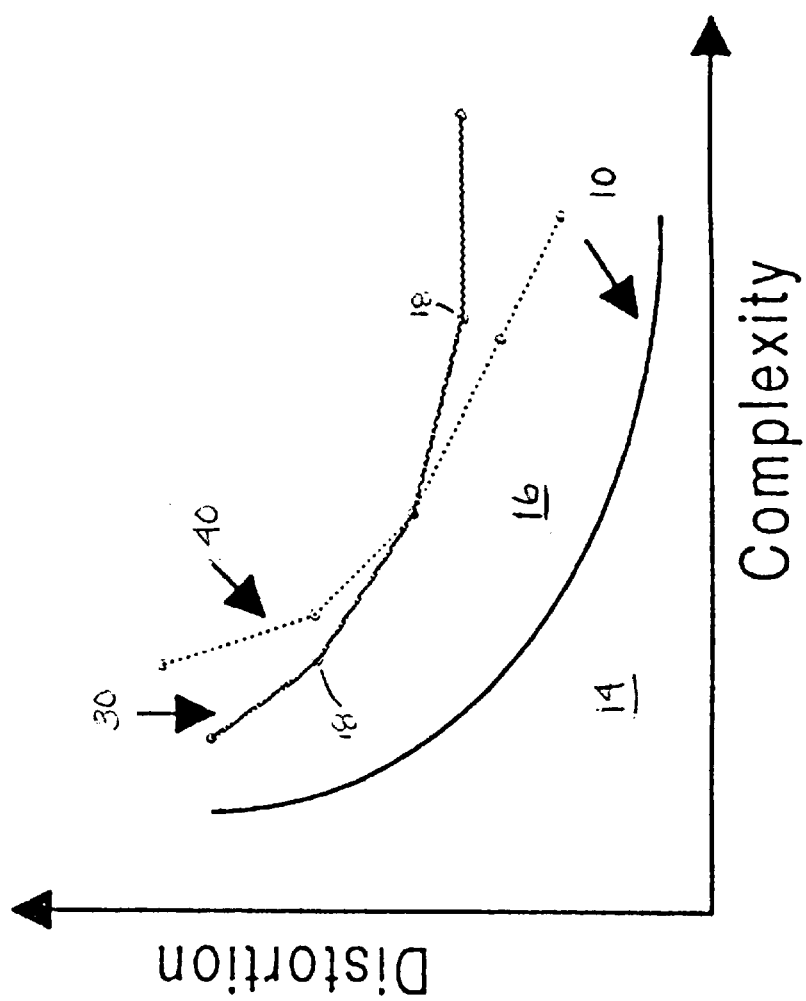
FIG. 2 illustrates two operational modes of a system and the theoretical lowest attainable bound of claim 1.

As discussed above, the fundamental research proves that the lowest complexity-distortion (C-D) bound 10 in a C-D plane exists. However, to design a system which is ideally on this bound 10 is not practical. In order to best achieve/approach this theoretical lowest bound 10, system designers usually search for the single best algorithm that can approach the bound 10 for different complexity levels. Usually a single algorithm is selected from a group of algorithms for the best match. But as is clearly illustrated in FIG. 2 for example, the operational 30, 40 curves of different algorithms may cross each other. This implies that one algorithm has a lower complexity level than the other at one distortion rate, but does not necessarily result in a lower complexity level at a different distortion rate.

Figure 6:
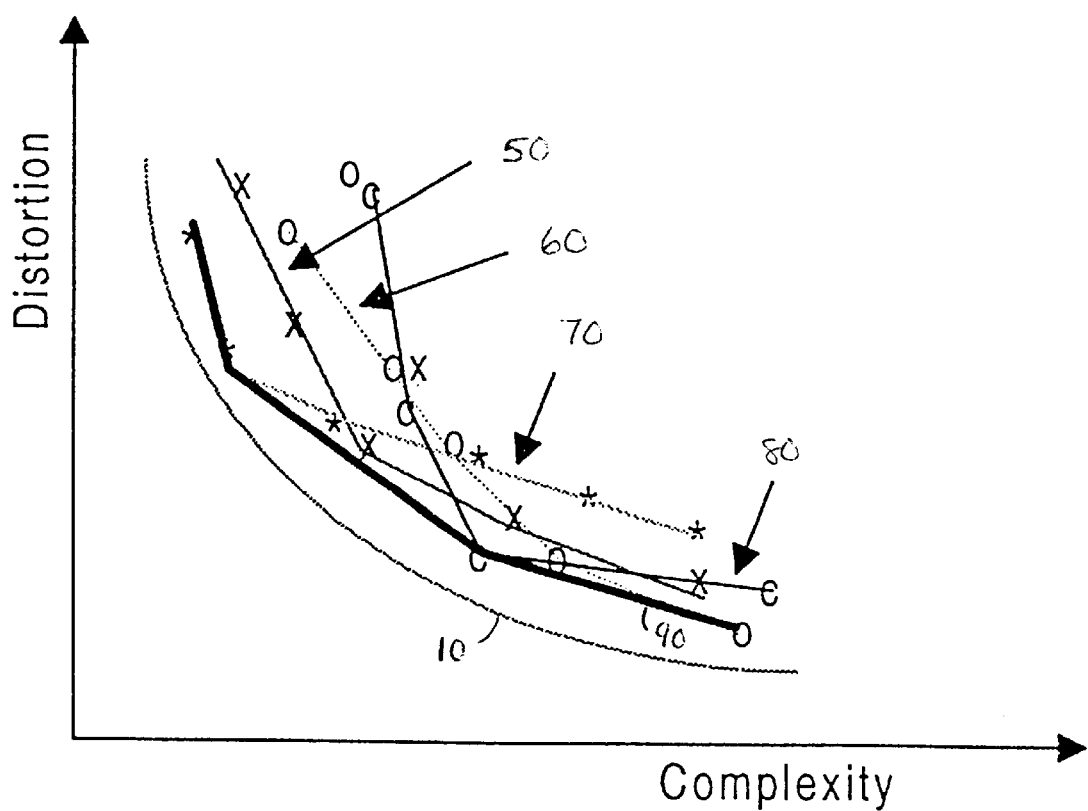
FIG. 6 illustrates a lowest C-D approach among various algorithms according to an embodiment of the present invention; and, FIG. 7 illustrates a scalable video decoder block diagram for an ATSC compliant DTV system according to another embodiment of the present invention.

Referring now to FIG. 6, in order to better approach the global optimal C-D bound 10, and according to a preferred form of the present invention: the operational curves of available algorithms are measured; then for a possible given data set, the algorithm which yields the lowest distortion rate for each complexity level within the operational curves is selected; finally, switch points on different operational curves are selected which results in a new global optimal operational curve. In other words, according to the present invention, switches between different algorithms 50, 60, 70, 80 are advantageously utilized to provide a better operational curve 90 than any of the individually tested algorithms 50, 60, 70, 80.

Figure 7:
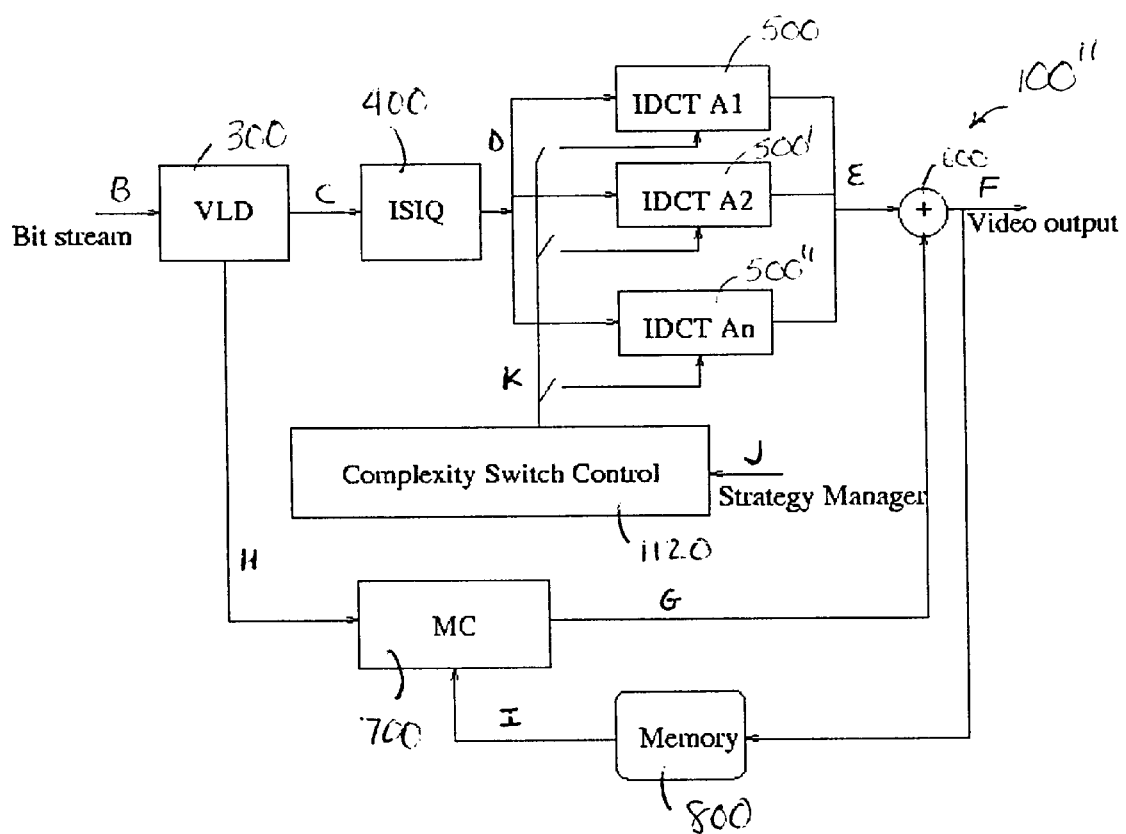

Referring now also to FIG. 7, therein is illustrated another ATSC compliant DTV video decoder 100" according to the present invention which includes a scalable IDCT functional block 500, 500', 500". Using the IDCT functional block 500, 500', 500" of MPEG2 decoder 100" as an embodiment of the disclosure, this approach proposes to use multiple Discrete Cosine Transform (DCT) algorithms to achieve an optimal scalability of the decoder with regards to the computation complexity and the quality. For a given complexity level, a DCT algorithm that is chosen to give the minimal distortion level.

It should be recognized that theoretically, if an infinite number of algorithms are available the lowest C-D bound 10 could be approached or nearly achieved by performing all the comparisons therebetween and selecting the best fit at each complexity. Practically however, the number of available algorithms and the comparison time are limited by design criteria, and the number of operational switching points is also limited as will be discussed. Therefore the approach of the present invention is to get the lowest possible quality distortion under certain given complexity using a certain number of available algorithms.

Figure 1:
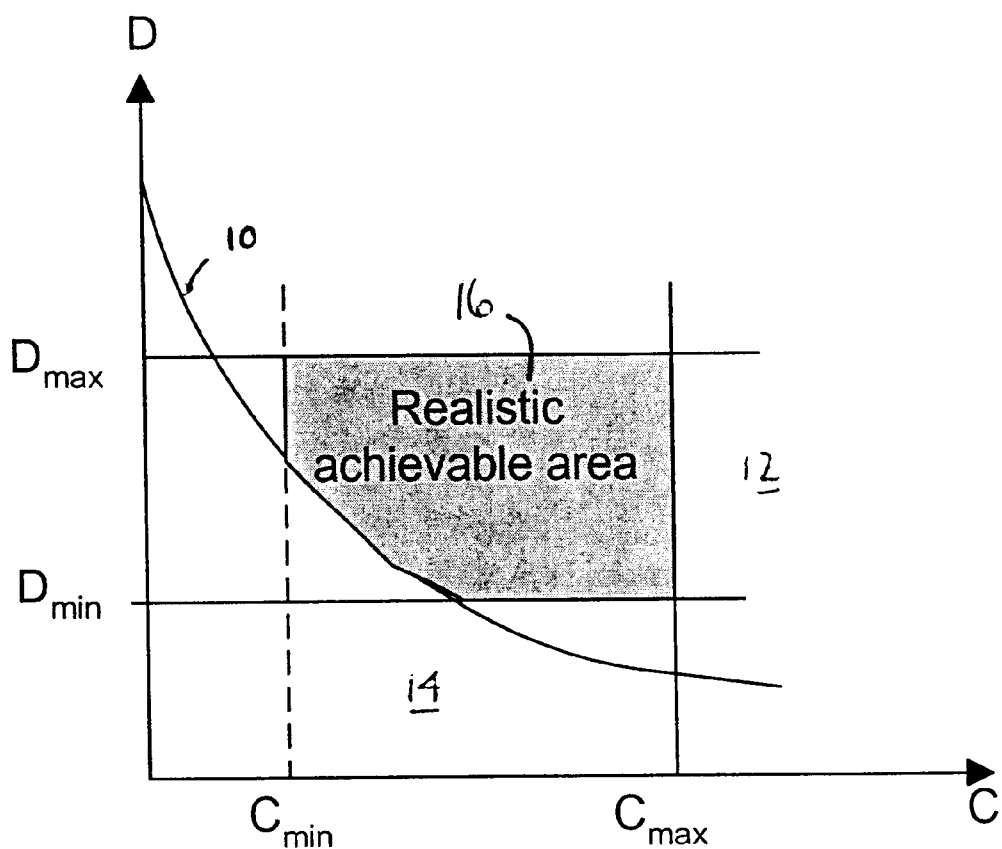
FIG. 1 illustrates a theoretical lowest attainable complexity-distortion bound.
Figure 3:
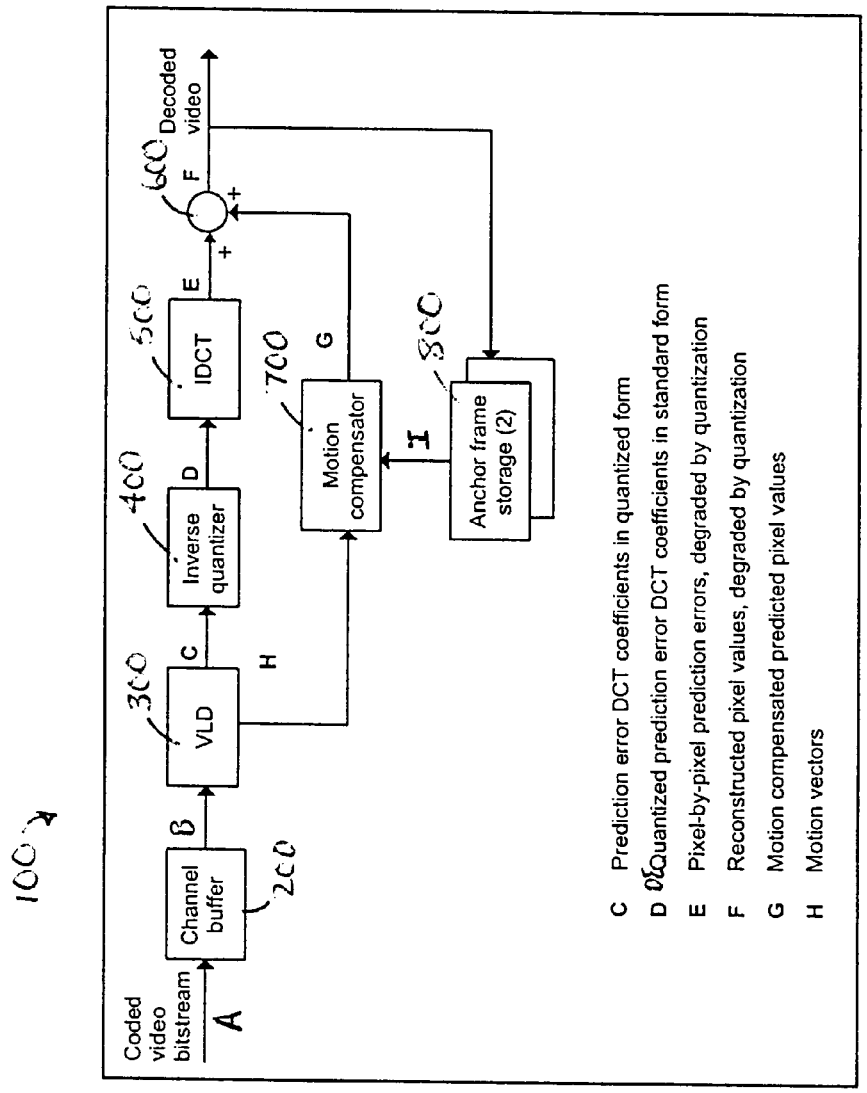
FIG. 3 illustrates a conventional video decoder block diagram for an ATSC compliant DTV system.

Referring still to FIG. 7, therein is illustrated a video decoder 100" block diagram for an ATSC compliant DTV system according to another form of the present invention. As can be readily ascertained, the decoder 100" incorporates many of the same elements as the decoder 100 of FIG. 1, therefore a discussion of these like elements will not be repeated. Referring now also to FIGS. 3 and 5, in contrast to the decoder 100 though, the decoder 100" includes multiple IDCT's 500, 500', 500" and complexity switch 1120 while the decoder 100' includes an IDCT 500' which can implement multiple algorithms and switch 1120. The complexity switch 1120 is responsive to signal J which originates from strategy manager 1100. The switch control 1120 outputs signal K in response to signal J which selectively activates ones of IDCT's 500, 500', 500". In the illustrated case of FIG. 7, there are n IDCTs, 500, 500', 500" which are switched between to provide n different algorithms. Alternatively, one or more IDCT's which are selectably activatable to use different algorithms can be used such as is illustrated in FIG. 5.

Referring again to FIG. 4 also, the QOS 1000 determines how much, or what percentage of Central Processing Unit (CPU) cycles, i.e. processing power, the MPEG2 decoder 100" is entitled to use. This may or may not be enough for full power MPEG2 decoding, i.e. non-scalable. The strategy manager 1100 receives this budget, together with other budgets for other applications. The strategy manager 1100 determines if this budgeted amount of computing or processing power is sufficient for full decoding. If the budgeted amount of computing power is not sufficient for a non-scalable decoding, it will either inform the local resource control 1120 to activate a scalable algorithm 1130, or request more resources from QOS manager 1000 for robustly maintaining a suitable output quality. Assuming the local resource manager 1120 of the MPEG2 decoder 100" receives the reduced budget, based on statistics gathered in advance, by using one or more look-up tables for example, a determination is made as to which scalable algorithm 30 will be activated at what level of available processing power. Assuming the global optimal IDCT algorithm according to the present invention is activated, and since the complexity versus distortion relationship is determined off-line in advance, at each complexity level the local resource manager 1120 has a well defined algorithm to call and use, as corresponding to a particular operational point.

For different algorithms, the complexity stretch is different. Not all the available algorithms will provide the same range of complexity-distortion measurement and range. The operational points for different algorithms may offset each other. The metric for complexity measurement for different algorithms should be universal, or scaled to the comparable level. The total number of machine cycles running the algorithm can be defined as the complexity level of the algorithm. However, in high level simulation of the scalable algorithms, it may not be realistic to measure the machine cycles as machine cycles are platform and CPU dependent. In such a case, the multiplication reduction ratio can be used as a complexity measurement.

According to one embodiment of the present invention, a procedure to obtain an operational C-D curve is as follows:
Step 1. The operational points of available algorithms are measured under different complexity levels; Step 2. Scale the operational points of different algorithms to the same scale and draw the operational curves on the same plot; Step 3. Find the switching points (cross points) of the operational curves; and, Step 4. The global optimal operational curve 90 is decided by selecting each operation curve portion which is nearest to the C-D curve 10 between each of the switching points.

To summarize, the disclosed method proposes a way to better approach the global optimal complexity-distortion bound 10 for a given system using multiple schemes, e.g. algorithms or modes. This method is based on the information-based complexity theory and is practically achievable. It can be used in scalable multimedia/communication system design and scalability analysis.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A method for operating a programmable processing device to reduce distortion in an outputted signal, the method comprising:
   providing data indicative of a plurality of operational states, each of said states being associated with at least one of a plurality of operational modes of said device, a complexity of operations and a distortion level;
   selecting one of said states for each of said complexities using said data and based upon said distortion levels;
   determining an operating status of said device; and,
   selecting which of said operational modes to operate said device in for each of said complexities responsively to said determined status using said selected states.

2. The method of claim 1, wherein said selected operational mode for a first determined status is different from said selected operational mode for a second determined status.

3. The method of claim 1, wherein said step of selecting a state is based upon minimizing said distortion level for said complexity.

4. The method of claim 1, wherein said step of providing comprises using at least one lookup table.

5. The method of claim 1, wherein said programmable device is a multimedia communications device.

6. The method of claim 1, wherein said device is an ATSC compliant digital television decoder including at least one IDCT, and each of said modes corresponds to a different mode of operation of said at least one IDCT.

7. The method of claim 1, wherein said selecting comprises determining which of said modes provides a complexity-distortion characteristic desirable to those of said other modes for performing said task using said available amount of computing resources.

8. A scalable programmable processing device comprising:
   at least one scalable application operable in plurality of modes each having a different complexity of operations characteristic;
   a QOS resource manager for tracking how much computing resources are available for use by said at least one scalable application;
   a strategy manager for determining whether said available resources are suitable for operation of said scalable application in a given one of said modes; and,
   a local resource control 1120 responsive to said strategy manager and for selecting, in response to a determination by said strategy manager that said available resources are not suitable for operation of said at least one application in said given mode to select another of said modes for said at least one application;
   wherein, said QOS manager and strategy manager are mutually responsive to one another and said at least one scalable application is responsive to said local resource control.

9. The device of claim 8, further comprising a memory accessible to said local resource control.

10. The device of claim 9, wherein said memory includes a data being indicative of complexity-distortion characteristics of each of said modes for a plurality of amounts of available system resources.

11. The device of claim 8, wherein said device is an ATSC compliant digital television decoder including at least one IDCT, and each of said modes corresponds to a different mode of operation of said at least one IDCT.

12. A scalable MPEG2 compatible video decoder comprising:
   at least one variable length decoder;
   at least one inverse quantizer coupled to said variable length decoder;
   at least one inverse discrete cosine transform coupled to said inverse quantizer;
   at least one motion compensator coupled to said variable length decoder;
   a summing junction coupled to said inverse discrete cosine transform and motion compensator; and,
   a controller;
   wherein at least one of said variable length decoder, inverse quantizer, inverse discrete cosine transform and motion compensator is coupled to said controller and responsive thereto to operate in one of a plurality of modes each having a given complexity characteristic for an acceptable distortion level of an output of said decoder; and,
   wherein said controller selects said one of said modes based upon said given complexity characteristics.

13. The decoder of claim 12, wherein said controller selects said one of said modes further based upon an available amount of computing resources for operating at least one of said variable length decoder, inverse quantizer, inverse discrete cosine transform and motion compensator.

14. The decoder of claim 12, wherein said at least one inverse discrete cosine transform includes a plurality of inverse discrete cosine transforms which is selectively operable in response to said controller.

15. The decoder of claim 14, wherein said selectively operated inverse discrete cosine transform implements said selected one of said modes.

16. The decoder of claim 15, wherein said complexity-distortion characteristic of said selected one of said modes is more efficient than those of the others of said plurality of modes.

* * * * *